US012435568B1

(12) United States Patent
Hayden

(10) Patent No.: US 12,435,568 B1
(45) Date of Patent: Oct. 7, 2025

(54) ADJUSTABLE LADDER PLATFORM

(71) Applicant: Charles S. Hayden, Upper Marlboro, MD (US)

(72) Inventor: Charles S. Hayden, Upper Marlboro, MD (US)

( * ) Notice: Subject to any disclaimer, the term of this patent is extended or adjusted under 35 U.S.C. 154(b) by 900 days.

(21) Appl. No.: 17/676,918

(22) Filed: Feb. 22, 2022

(51) Int. Cl.

| | |
|---|---|
| ***E06C 7/44*** | (2006.01) |
| ***E04G 1/36*** | (2006.01) |
| ***E04G 3/26*** | (2006.01) |
| ***E06C 7/00*** | (2006.01) |
| ***E06C 7/42*** | (2006.01) |

(52) U.S. Cl.
CPC ................ *E06C 7/44* (2013.01); *E04G 1/365* (2013.01); *E04G 3/26* (2013.01); *E04G 3/265* (2013.01); *E06C 7/003* (2013.01); *E06C 7/426* (2013.01)

(58) Field of Classification Search
CPC . E06C 7/44; E06C 7/003; E06C 7/426; E04G 1/365; E04G 3/26; E04G 3/265
USPC .......................................................... 182/200
See application file for complete search history.

(56) References Cited

U.S. PATENT DOCUMENTS 786,499 A * 4/1905 Johnson .................... E04G 3/26 248/237
955,159 A * 4/1910 Hillmon .................... E04G 3/26 248/237
1,452,717 A * 4/1923 Wertz ...................... E04G 5/041 182/20
2,275,014 A * 3/1942 Hahler ...................... E04G 3/26 248/237
2,320,538 A * 6/1943 Vogt .......................... E04G 3/26 182/45
3,993,275 A 11/1976 Lucas
4,304,318 A 12/1981 Webb
4,342,374 A * 8/1982 Montana ................. E06C 7/426 248/237
4,671,383 A * 6/1987 Huang .................... E06C 7/426 182/204
4,699,247 A 10/1987 Clarke
4,856,745 A * 8/1989 Mabie ..................... E04G 3/265 248/237
5,139,109 A 8/1992 Clarke
(Continued)

FOREIGN PATENT DOCUMENTS

DE 19950076 A1 * 8/2001 ............. E04D 13/12
DE 202013001818 U1 * 7/2013 ............. E04G 3/265
(Continued)

*Primary Examiner* — Taylor Morris
(74) *Attorney, Agent, or Firm* — Cramer Patent & Design, PLLC.; Aaron R. Cramer

(57) ABSTRACT

An adjustable ladder platform is an apparatus that aids in keeping extension ladders on firm, level footing having an open base frame that sits directly on the unlevel ground, roof surface, pavement or the like a flat surface, similar to a small tabletop that supports the feet of the extension ladder. The two components are then hinged together at one side of the frame. Then the opposite side is supported by two adjustable arms that are attached by bolts and wingnuts that can be attached and removed without tools. The arms are provided with multiple holes to accommodate varying grades. One side of the device is provided with an attached bubble level to ensure levelness of the upper platform to ensure safety. Finally, one side of the device is provided with a handle to facilitate transport.

17 Claims, 7 Drawing Sheets

(56) References Cited

U.S. PATENT DOCUMENTS 5,249,397 A * 10/1993 Monaco .................. E04G 3/265 52/126.1
5,791,438 A 8/1998 Kempton
5,913,782 A * 6/1999 Monaco .................... E04G 3/26 52/126.1
5,979,600 A * 11/1999 Bitner ....................... E04G 3/26 52/27
6,044,929 A 4/2000 Wishner
6,269,905 B1 * 8/2001 Smith ....................... E04G 3/26 248/237
6,547,036 B1 4/2003 Carter
6,732,480 B1 * 5/2004 Smith ..................... E04D 15/00 52/749.12
6,745,869 B2 * 6/2004 Garrett .................... E04D 15/00 182/45
6,926,241 B2 * 8/2005 Garrett ................. B23D 45/003 248/229.1
6,932,191 B1 * 8/2005 Schwenk ................ E04G 5/041 248/237
7,059,059 B1 * 6/2006 Ames ....................... G01C 9/28 33/372
7,686,134 B1 * 3/2010 Harris ..................... E06C 7/426 182/222
8,042,651 B1 10/2011 Michnik et al.
8,382,056 B2 2/2013 Le Masurier et al.
9,010,491 B2 * 4/2015 Trang ........................ E06C 7/46 182/201
10,738,534 B2 * 8/2020 Bø .......................... E06C 7/188
2005/0223660 A1 * 10/2005 Henning ................... E04G 3/26 52/203
2006/0207830 A1 * 9/2006 Gray ....................... E06C 7/003 182/18
2008/0006479 A1 * 1/2008 Mabry .................... E06C 7/003 182/18
2008/0035424 A1 * 2/2008 Klockler ................. E06C 7/426 182/116
2011/0226551 A1 * 9/2011 Iverson ..................... E06C 7/44 182/107
2012/0080264 A1 * 4/2012 Lord ......................... E04G 3/26 182/45
2012/0234629 A1 * 9/2012 Peters ..................... E04G 1/365 182/151

FOREIGN PATENT DOCUMENTS

DE 202013002899 U1 * 7/2013 ............. E04G 3/265
DE 102018124782 A1 * 4/2020 ............. E06C 7/003
FR 2686939 A1 * 8/1993 ............. E06C 7/003
GB 550143 A * 12/1942 ............... E04G 3/26

* cited by examiner

ADJUSTABLE LADDER PLATFORM

RELATED APPLICATIONS

None.

FIELD OF THE INVENTION

The presently disclosed subject matter is directed to a ladder platform and more specifically to an adjustable ladder platform.

BACKGROUND OF THE INVENTION

There is a seemingly endless list of activities performed at home, work, and in many other environments that require the use of a ladder in order to allows its user to gain access to areas that otherwise would be inaccessible. Hand-in-hand with the great utilitarian functions of ladder use goes an increased danger related to slips and falls from elevated positions where serious injury or even death can result. Quite often, the area in which the ladder is to be used provides an uneven surface upon which to place the ladder legs. As a result, the user is placed in a situation of increased danger as the ladder is prone to tip.

Many users opt to place blocks or other items beneath the ladder legs in order to level its foundation. However, this is an unwise practice because the ladder can slip off the blocks, thus increasing the likelihood of injury rather than reducing it. Accordingly, there is a need for a solution to the problem where a ladder must be used in an area with an uneven surface. The development of the adjustable ladder platform is such a solution.

SUMMARY OF THE INVENTION

The principles of the present invention provide for a platform leveling device that has, a platform base having a top surface supported by a pair of top side members, a bubble vial attached on a front face of one of the pair of top side members is adapted to assist a user when the top surface is level, a pair of support base members disposed on an interior of the pair of top side members to support the platform base, a pair of support arms each pivotally attached via a first fastener to each of the pair of support base members, and a main pivot fastener pivotally attaching the pair of top side members and the pair of support base members. The platform leveling device adapted to aid in keeping a ladder on a firm and level footing, when used on a non-level surface.

The platform leveling device may further comprise an extension ladder that may be placed atop the non-level surface using a rule of thumb that for every four feet of elevation of the extension ladder, a base of the extension ladder is located one foot away from the structure to produce a stable configuration for the extension ladder to allow for safe ascension. The platform base may be planar. A pair of attachment holes disposed on each of the pair of top side members may attach a first end of each of the support arms. To support a first end of the platform base away from the main pivot fasteners, the pair of support arms may be pivoted upward from their stored position along an angular displacement travel path. The platform base may be elevated along the angular displacement travel path such that a level elevation of the top non-level surface is produced. The bubble vial may be attached on the front face of one of the pair of top side members with a plurality of second fasteners.

The second fasteners may be a plurality of screws. The pair of support base members may be pivoted downward from the platform base and thus the pair of top side members along the main pivot fasteners for a displacement along an angular displacement travel path. To accommodate for a plurality of different degrees of the angular displacement travel path, the pair of support arms may include a plurality of alignment holes one of which is selected for use with the attachment holes and the fastening system to produce a degree of levelness as determined by the bubble vial. The platform leveling device may further comprise a cross member that may be attached near a midpoint of the pair of support base members to provide structural stability. The cross member may serve as a mounting point for a carrying handle, as well as a storage position for the pair of fastening systems as they cannot be stored in the pair of support base members due to proximity of the pair of top side members when the platform leveling device is in a closed state.

When in the closed state, a pair of forward stairway supports may be folded, and a pair of rear stairway support blocks may be stored on an underside of the platform base. The platform leveling device further comprising a pair of forward stairway blocks may be attached to a forward inner side of the support base members, via a respective third fastening system that is horizontally and vertically aligned with each other to further aid in stability and may prevent slippage of the platform leveling device. A base of the forward stairway may block, and a base of rearward stairway may block and may be positioned such that they rest upon a step tread. A distal end of each of the pair of support arms may be away from the first fastener and secured to one of a plurality of attachment holes with a fastening system. The fastening system may be a bolt and a wingnut. The platform leveling device may aid in keeping the ladder on the firm and level footing, when used on an uneven grade. The uneven grade may be when a structure selected from the group consisting of a home, a business, a garage, an apartment, or a shop is on a sloping land. The pair of support base members may be placed against the uneven grade with the main pivot fasteners located at a higher elevation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
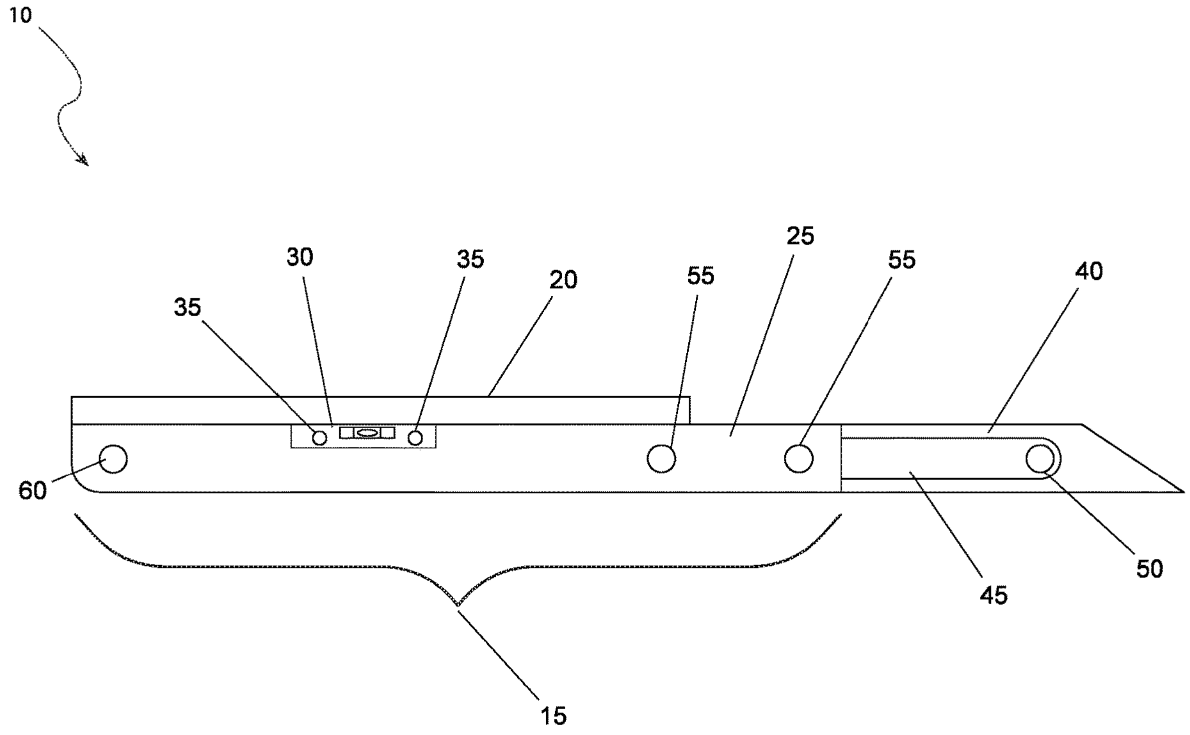
FIG. 1 is a front view of a platform leveling device in a closed state, according to the preferred embodiment of the present invention.

10 platform leveling device
15 platform base
20 top surface
25 top side member
30 bubble vial
35 first fastener
40 support base member
45 support arm
50 second fastener
55 attachment hole
60 main pivot fastener
65 angular displacement travel path "a"
70 angular displacement travel path "b"
75 fastening system
80 alignment hole
85 cross member
90 carrying handle
95*a* forward stairway support
95*b* rear stairway support
100 side member
105 spacing block
110*a* third fastening system
110*b* fourth fastening system
115 uneven grade
120 structure
125 ladder
130 stairway
135 step tread
140 uppermost step tread

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the platform leveling device 10 for a ladder 125 in a closed state, according to the preferred embodiment of the present invention is disclosed. The platform leveling device (herein also described as the "device") 10, aids in keeping ladders 125 on firm, level footing, when used on uneven grade 115 or other non-level surfaces. The closed state of the device 10 would be realized during storage and transport of the device 10. A platform base 15, planar in construction, is comprised of a top surface 20 supported by two (2) top side members 25 (of which only one (1) is shown due to illustrative limitations). The top surface 20 is envisioned to be approximately two and a half square feet (2-½ ft2) in length. A bubble vial 30 is provided on the front face of the shown top side member 25 to assist the user when the top surface 20 is level. The bubble vial 30 is attached to the top side member 25 with multiple first fasteners 35, such as screws. Located immediately to the interior of the top side members 25 are two (2) support base members 40 (of which only one (1) is shown due to illustrative limitations). The support base members 40 are used to support the platform base 15 when the device 10 is used on uneven or unlevel surfaces as will be explained in greater detail herein below.

A total of two (2) support arms 45 (one (1) per each support base member 40) are pivotally attached via a second fastener 50. Two (2) attachment holes 55 are provided in each top side member 25 for purposes of attaching the distal end of the support arms 45 and will be shown in greater detail herein below. The top side members 25 and the support base members 40 are pivotally attached to each other via a main pivot fastener 60.

Figure 2:
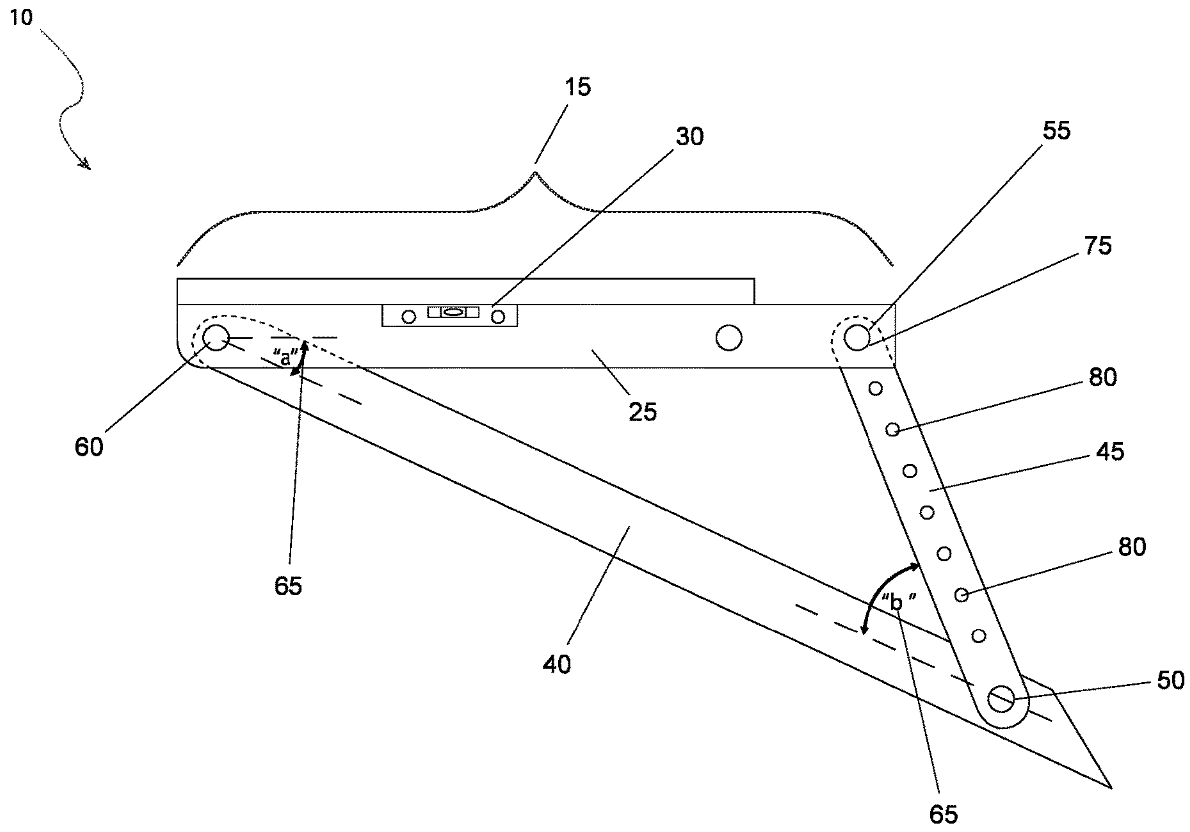
FIG. 2 is a front view of the platform leveling device in an open state, according to the preferred embodiment of the present invention.

Referring next to FIG. 2, a front view of the device 10 in an open state, according to the preferred embodiment of the present invention is depicted. The open state would be realized during utilization of the device 10. During utilization, the support base members 40 are pivoted downward from the platform base 15 and thus the top side members 25 along the main pivot fasteners 60 for a displacement along an angular displacement travel path "a" 65. To support the distal end of the platform base 15 away from the main pivot fasteners 60, the support arms 45 are pivoted upward from their stored position (as shown in FIG. 1) along an angular displacement travel path "b" 70. The distal end of the support arms 45, away from the second fastener 50 is secured to one (1) of the attachment holes 55 by use of a fastening system 75, such as a bolt and a wingnut. To accommodate varying degrees of angular displacement travel path "a" 65, the support arms 45 is provided with multiple alignment holes 80 of which one (1) is selected for use with the attachment holes 55 and fastening system 75 to produce the best degree of levelness as determined by the bubble vial 30.

Figure 3:
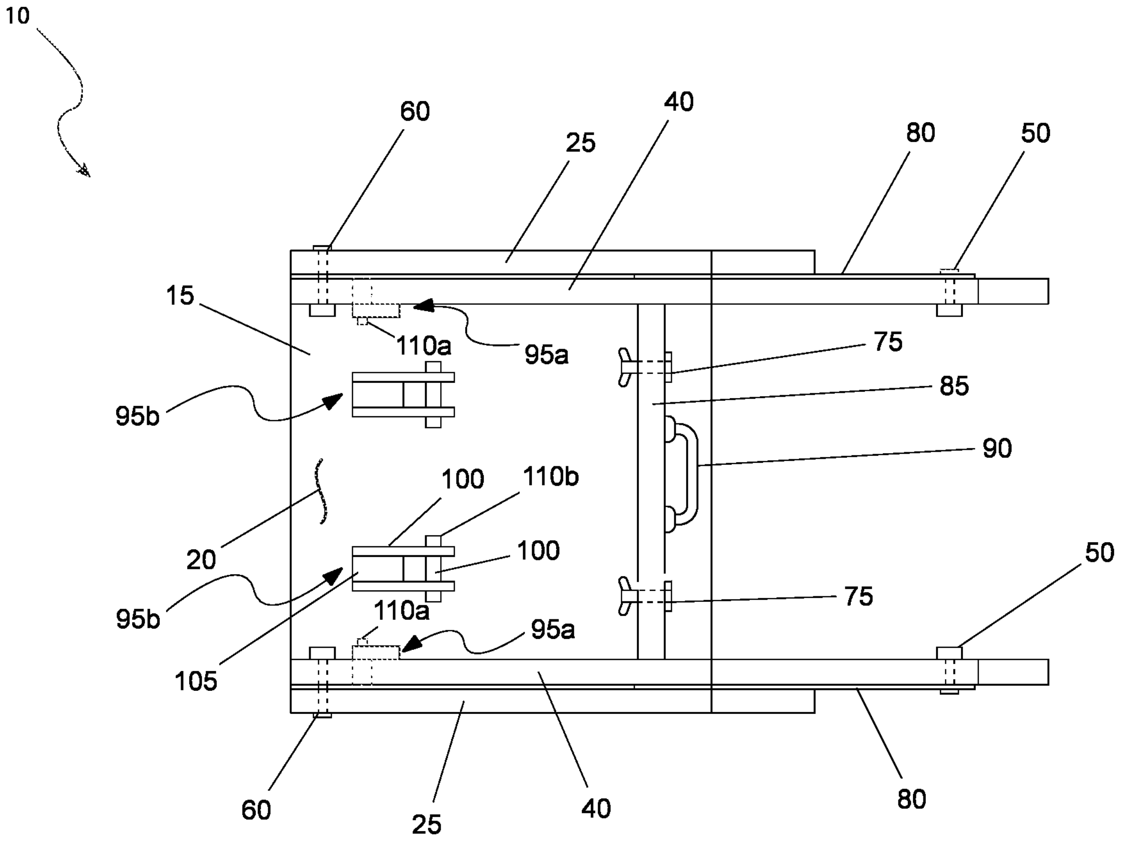
FIG. 3 is a bottom of the platform leveling device in a closed state, according to the preferred embodiment of the present invention.

Referring now to FIG. 3, a bottom view of the device 10 in a closed state, according to the preferred embodiment of the present invention is shown. The platform base 15 is bordered on two (2) opposite sides by the top side members 25. The two (2) support base members 40 are then located interiorly to the top side members 25 and pivotally attached by the main pivot fasteners 60. A cross member 85 is then attached near the midpoint of the two (2) support base members 40 to provide structural stability. The cross member 85 serves as a mounting point for a carrying handle 90, as well as a storage position for the two (2) fastening systems 75 as they cannot be stored in the support base members 40 due to the close proximity of the top side members 25 when the device 10 is in a closed state as shown. Additionally, when in a closed state, a pair of forward stairway supports 95*a* can be folded and a pair of rear stairway support blocks 95*b* can be stored on the underside of the platform base 15. Further usage details of the forward stairway supports 95*a* and rear stairway supports 95*b* will be provided herein below.

Figure 4:
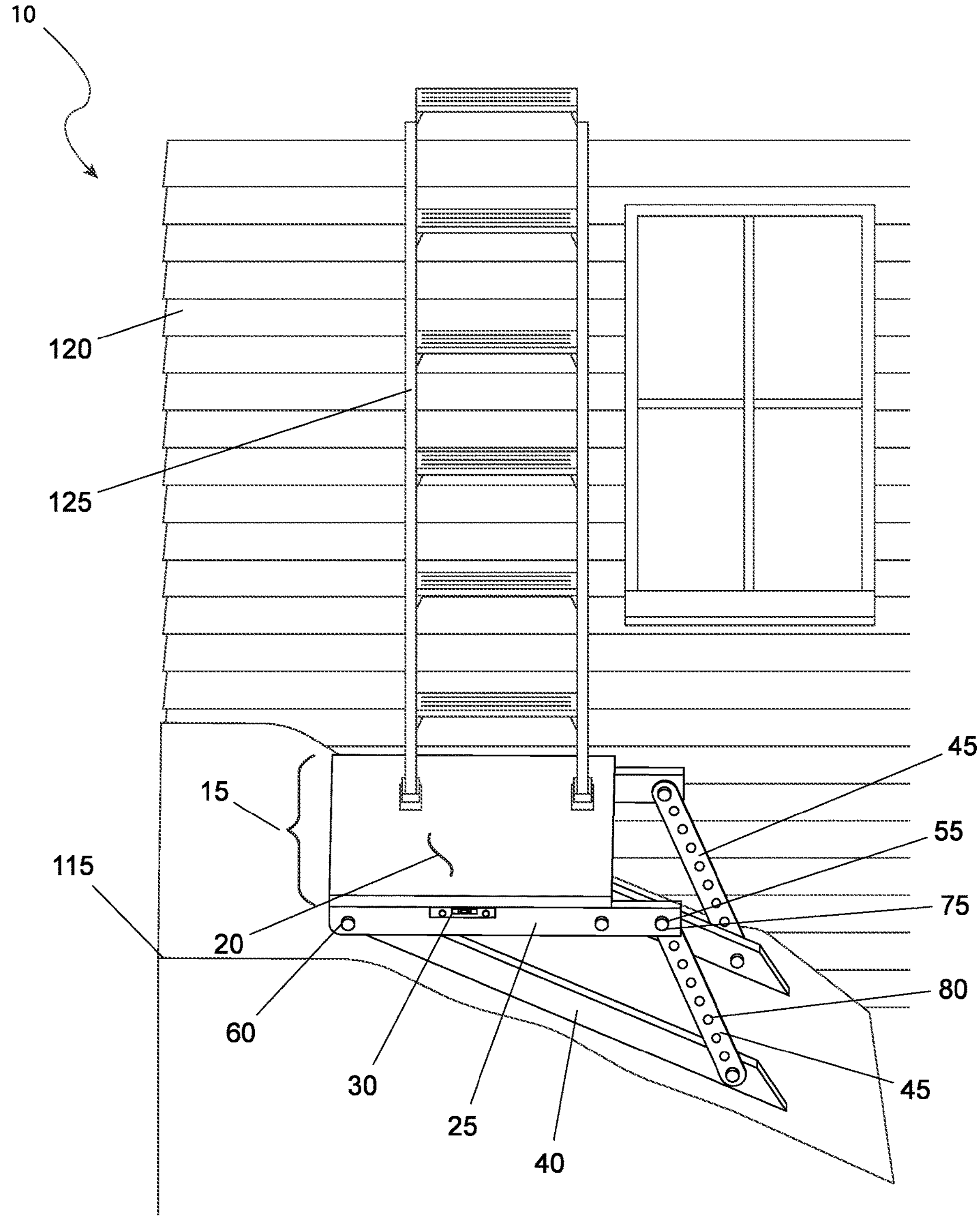
FIG. 4 is a perspective view of the platform leveling device, shown in a utilized state on uneven grade, according to the preferred embodiment of the present invention.

Referring next to FIG. 4, a perspective view of the device 10, shown in a utilized state on uneven grade 115, according to the preferred embodiment of the present invention is disclosed. The uneven grade 115 is produced when a structure 120 such as a home (as shown), a business, garage, apartment, shop, or the like is present on greatly sloping land. The support base members 40 are placed against the uneven grade 115 with the main pivot fasteners 60 located at the higher elevation. The platform base 15 is then elevated along the angular displacement travel path "a" 65 (as shown in FIG. 2), such that a level elevation of the top surface 20 is produced. Levelness may be verified using the bubble vial 30. The support arms 45 are raised along the angular displacement travel path "b" 70 (as shown in FIG. 2) and secured to the attachment holes 55 in the top side members 25 using the fastening system 75 on both sides of the top surface 20 using an appropriate alignment hole 80 in each support arms 45. An extension ladder 125 may then be placed atop the top surface 20 using a general rule of thumb that for every four feet (4 ft.) of elevation of the extension ladder 125, the base of the extension ladder 125 is located one foot (1 ft.) away from the structure 120. This produces a stable configuration for the extension ladder 125 allowing it to be safely ascended.

Figure 5:
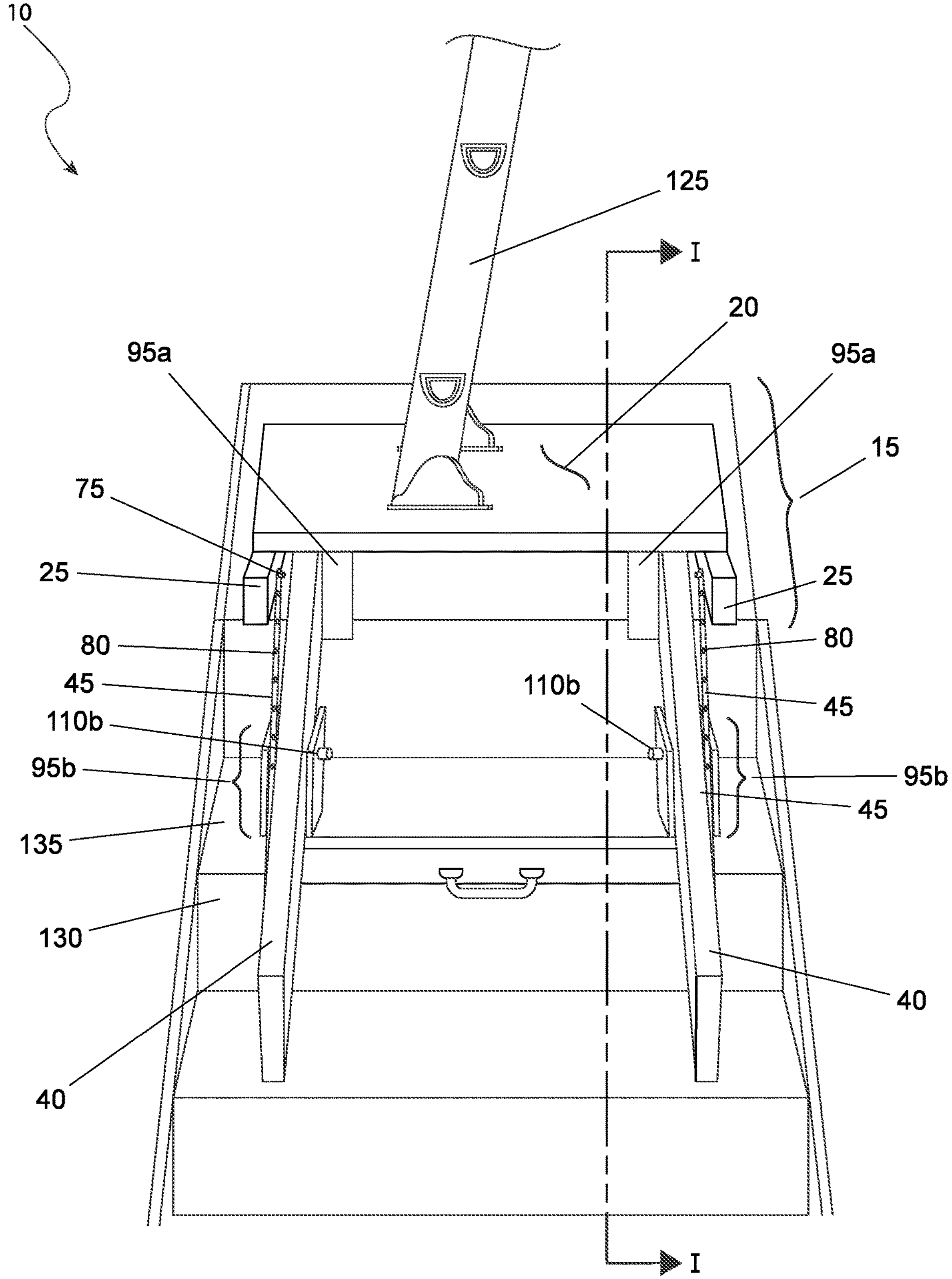
FIG. 5 is a perspective view of the platform leveling device, shown in a utilized state on a stairway, according to the preferred embodiment of the present invention.

Referring to FIG. 5, a perspective view of the device 10, shown in a utilized state on a stairway 130, according to the preferred embodiment of the present invention is depicted. The stairway 130 is typical in design and would be found inside of a home, business, apartment, commercial building, institutional building, industrial building, or the like. The support base members 40 are rested against the outer edge of each step tread 135 with the main pivot fasteners 60 (not visible in this FIG. due to illustrative limitations) located at the uppermost step tread 140. The platform base 15 is then elevated along the angular displacement travel path "a" 65 (as shown in FIG. 2), such that a level elevation of the top surface 20 is produced. Levelness may be verified using the bubble vial 30 (not visible in this FI due to illustrative limitations). The support arms 45 are raised along the angular displacement travel path "b" 70 (as shown in FIG. 2) and secured to the attachment holes 55 in the top side members 25 using the fastening system 75 on both sides of the top surface 20 using an appropriate alignment hole 80 in each support arms 45.

To further aid in stability and prevent slippage of the device 10, a pair of forward stairway blocks 95*a* are attached to a forward inner side of the support base members 40, via a respective third fastening system 110*a*, and preferably horizontally and vertically aligned with each other. A pair of rearward stairway blocks 95*b*, further comprising the side members 100 (as shown in FIG. 3) and the spacing block 105 (as shown in FIG. 3) are secured to an intermediate location on the support base members 40 and rearward of the pair of forward stairway blocks 95*a*, by use a fourth fastening system 110*b*. The positioning of the pair of rearward stairway blocks 95*b* are on opposing inner surfaces of the support base members 40, preferably horizontally and vertically aligned with each other.

The base of the forward stairway blocks 95*a* and rearward stairway blocks 95*b* are positioned such that they rest upon a step tread 135. An extension ladder 125 may then be placed atop the top surface 20. This produces a stable configuration for the extension ladder 125 allowing it to be safely ascended. The configuration as shown in FIG. 5, may be necessary for such tasks such as painting of wall and ceiling surfaces above the stairway 130, maintenance of light fixtures, heating, ventilating and air conditioning equipment (HVAC) and the like.

Figure 6:
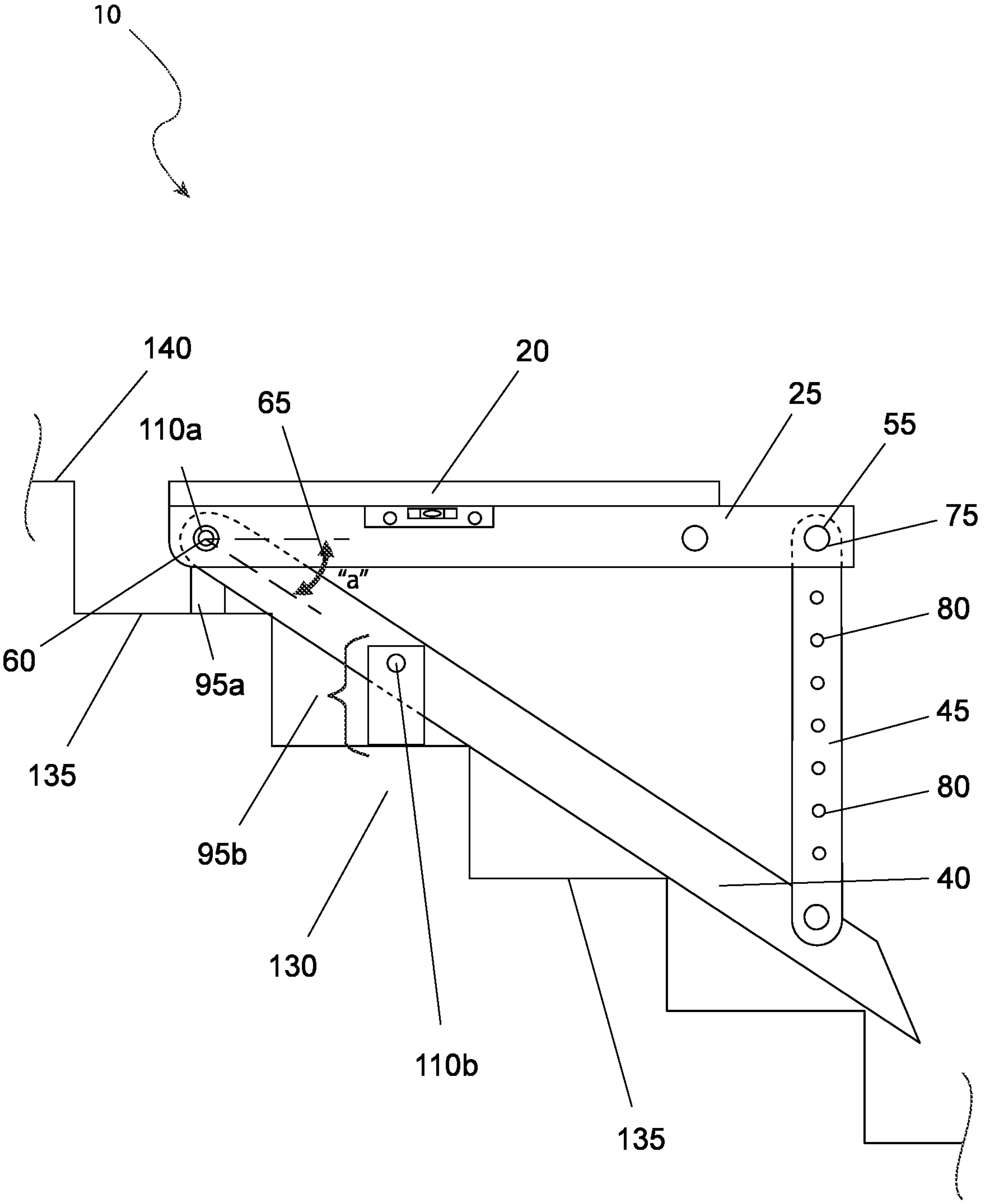
FIG. 6 is a sectional view of the platform leveling device, as seen along a Line I-I, as shown in FIG. 5, according to the preferred embodiment of the present invention.
Figure 7:
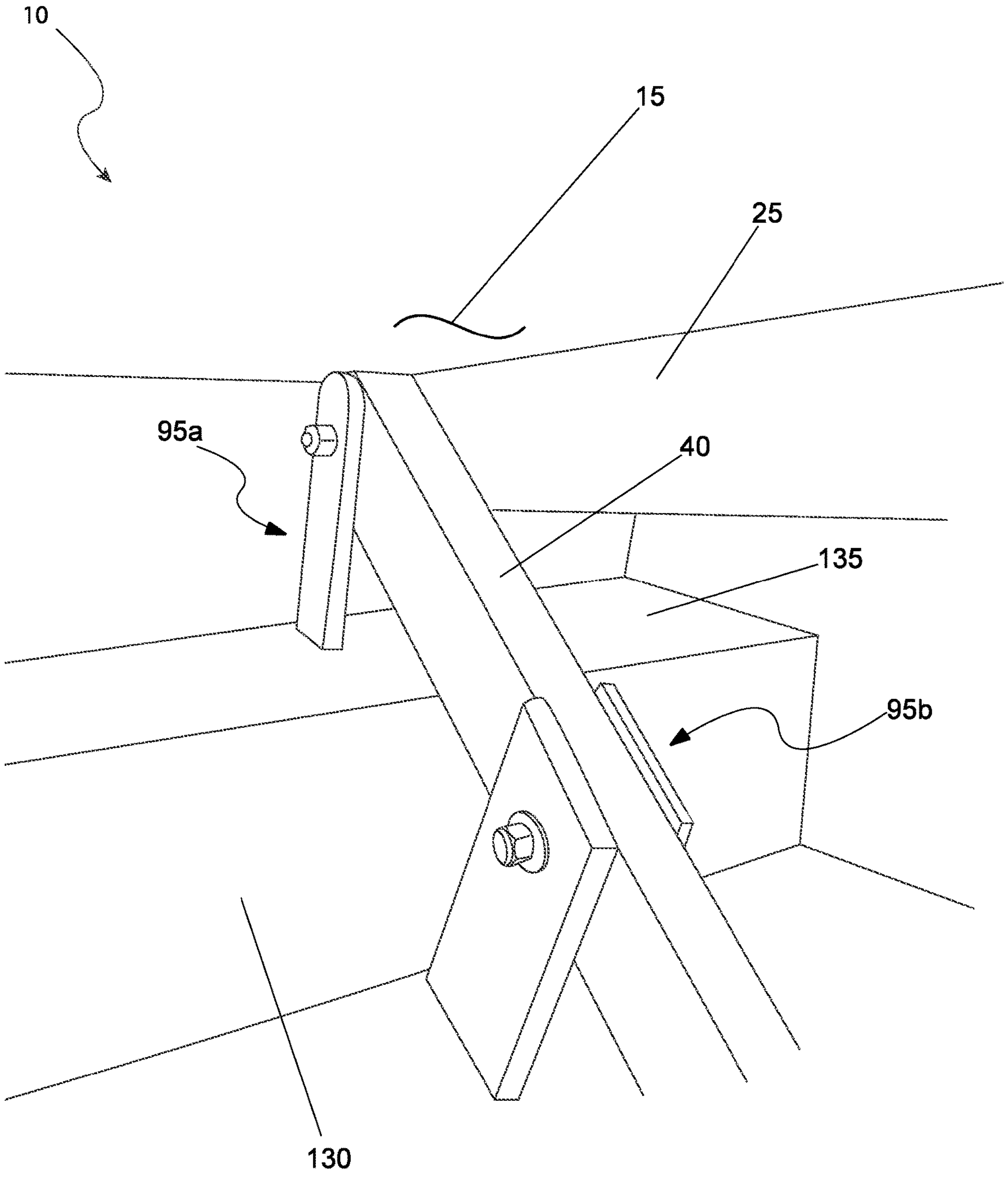
FIG. 7 is a close-up environmental perspective view of the platform leveling device, according to the preferred embodiment of the present invention.

Referring to FIG. 6, a sectional view of the platform leveling device 10, as seen along a Line I-I, as shown in FIG. 5, and FIG. 7, a close-up environmental perspective view according to the preferred embodiment of the present invention is shown. The stairway 130 is depicted along the lower portion of the view. The support base members 40 are rested against the outer edge of each step tread 135 with the main pivot fasteners 60 located at the uppermost step tread 140. The platform base 15 is then elevated along the angular displacement travel path "a" 65 such that a level elevation of the top surface 20 is produced. The support arms 45 are secured to the attachment holes 55 in the top side members 25 using the fastening system 75 on both sides of the top surface 20 using an appropriate alignment hole 80 in each support arms 45 that correspond to the angle or incline of the stairway 130. The forward stairway blocks 95*a* are secured to the support base members 40 with the third fastening system 110*a*. The rearward stairway blocks 95*b*, including the side members 100 (of which only one (1) is shown due to illustrative limitations) and the spacing block 105 (as shown in FIG. 3) are secured to the support base members 40 using the fourth fastening system 110*b*. The base of the forward stairway blocks 95*a* and rearward stairway blocks 95*b* are positioned such that they rest upon a step tread 135.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 7. The user would procure the device 10 from conventional procurement channels such as hardware stores, home improvement stores, mechanical supply houses, mail order and internet supply houses and the like.

After procurement and prior to utilization, the device 10 would be prepared in the following manner: usage on an uneven grade 115 or stairway 130 would be decided by the user; in the case of the uneven grade 115, the configuration of FIG. 4 would be followed; in the case of usage on the stairway 130, the configuration of the FIG. 5 would be followed. General practice would be to place the device 10 with the main pivot fasteners 60 located at the higher elevation. The platform base 15 is then elevated along the angular displacement travel path "a" 65, such that a level elevation of the top surface 20 is produced. Levelness may be verified using the bubble vial 30. The support arms 45 are raised along the angular displacement travel path "b" 70 and secured to the attachment holes 55 in the top side members 25 using the fastening system 75 on both sides of the top surface 20 using an appropriate alignment hole 80 in each support arms 45. In the case of usage on a stairway 130, the forward stairway blocks 95*a* are secured to the support base members 40 using the third fastening system 110*a*, the rearward stairway blocks 95*b*, consisting of the side members 100 and the spacing block 105, are secured to the support base members 40 using the fourth fastening system 110*b*, and with the base of the forward stairway blocks 95*a* and rearward stairway blocks 95*b* positioned such that they rest upon a step tread 135. At this point in time the device 10 is ready for usage.

During utilization of the device 10, the following procedure would be initiated: an extension ladder 125 is then placed upon the top surface 20 in a conventional manner.

The extension ladder 125 may be ascended and descended safe in the knowledge that it is situated on a stable and level base.

After use of the device 10, the extension ladder 125 is removed, if used, the forward stairway blocks 95*a* and rearward stairway blocks 95*b* are removed (if used), the fastening system 75 is removed and stored in the cross member 85; the support arms 45 are folded inward; and the support base members 40 are folded inward. The device 10 may be carried via the carrying handle 90 and stored until needed again in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A platform leveling device, comprising:

a platform base having a top surface supported by a pair of top side members;

a bubble vial attached on a front face of one of the pair of top side members is adapted to assist a user when the top surface is level;

a pair of support base members disposed on an interior of the pair of top side members to support the platform base; a cross member that is attached near a midpoint of the pair of support base members to provide structural stability;

a pair of support arms each pivotally attached via a first fastener to each of the pair of support base members; and a main pivot fastener pivotally attaching the pair of top side members and the pair of support base members; and, wherein the platform leveling device is adapted to aid in keeping a ladder on a firm and level footing, when used on a non-level surface;

wherein the cross member serves as a mounting point for a carrying handle, as well as a storage position for a pair of fastening systems as they cannot be stored in the pair of support base members due to proximity of the pair of top side members when the platform leveling device is in a closed state; and, wherein when in the closed state, a pair of forward stairway supports are folded, and a pair of rear stairway support blocks are stored on an underside of the platform base.

2. The platform leveling device, according to claim 1, further comprising an extension ladder that is placed atop the non-level surface using a rule of thumb that for every four feet of elevation of the extension ladder, a base of the extension ladder is located one foot away from the structure to produce a stable configuration for the extension ladder to allow for safe ascension.

3. The platform leveling device, according to claim 1, wherein the platform base is planar.

4. The platform leveling device, according to claim 1, wherein a pair of attachment holes disposed on each of the pair of top side members attach a first end of each of the support arms.

5. The platform leveling device, according to claim 1, wherein to support a first end of the platform base away from the main pivot fasteners, the pair of support arms are pivoted upward from their stored position along an angular displacement travel path.

6. The platform leveling device, according to claim 5, wherein the platform base is elevated along the angular displacement travel path such that a level elevation of the top non-level surface is produced.

7. The platform leveling device, according to claim 1, wherein the bubble vial is attached on the front face of one of the pair of top side members with a plurality of second fasteners.

8. The platform leveling device, according to claim 7, wherein the second fasteners are a plurality of screws.

9. The platform leveling device, according to claim 1, wherein the pair of support base members are configured to pivot downward from the platform base.

10. The platform leveling device, according to claim 9, wherein to accommodate for a plurality of different degrees of the angular displacement travel path, the pair of support arms include a plurality of alignment holes one of which is selected for use with the attachment holes and fastening system to produce a degree of levelness as determined by the bubble vial.

11. The platform leveling device, according to claim 1, wherein the pair of forward stairway supports further comprise a pair of forward stairway blocks that are attached to a forward inner side of the support base members, via a respective third fastening system that is horizontally and vertically aligned with each other to further aid in stability and prevent slippage of the platform leveling device.

12. The platform leveling device, according to claim 11, wherein a base of the forward stairway blocks and a base of rear stairway blocks are positioned such that they rest upon a step tread.

13. The platform leveling device, according to claim 1, wherein a distal end of each of the pair of support arms are away from the first fastener and secured to one of a plurality of attachment holes with a fastening system.

14. The platform leveling device, according to claim 13, wherein the fastening system is a bolt and a wingnut.

15. The platform leveling device, according to claim 1, wherein the platform leveling device aids in keeping the ladder on the firm and level footing, when used on an uneven grade.

16. The platform leveling device, according to claim 15, wherein the uneven grade is when a structure selected from the group consisting of a home, a business, a garage, an apartment, or a shop is on a sloping land.

17. The platform leveling device, according to claim 15, wherein the pair of support base members are placed against the uneven grade with the main pivot fasteners located at a higher elevation than the pair of support base members.

* * * * *